United States Patent
Van Oort

(10) Patent No.: US 12,495,019 B1
(45) Date of Patent: Dec. 9, 2025

(54) APPARATUS, SYSTEMS AND METHODS FOR MULTI-CARRIER AND MULTI-TENANT END-TO-END PRIVATE WIDE AREA NETWORK

(71) Applicant: R&D Industries, Inc., Milford, IA (US)

(72) Inventor: Donald Van Oort, West Okoboji, IA (US)

(73) Assignee: R&D Industries, Inc., Milford, IA (US)

( * ) Notice: Subject to any disclaimer, the term of this patent is extended or adjusted under 35 U.S.C. 154(b) by 643 days.

(21) Appl. No.: 16/777,561

(22) Filed: Jan. 30, 2020

Related U.S. Application Data

(60) Provisional application No. 62/798,561, filed on Jan. 30, 2019.

(51) Int. Cl.
| | |
|---|---|
| H04L 29/06 | (2006.01) |
| H04L 9/40 | (2022.01) |
| H04L 12/66 | (2006.01) |
| H04L 43/12 | (2022.01) |
| H04L 45/586 | (2022.01) |
| H04L 49/552 | (2022.01) |
| H04L 67/12 | (2022.01) |
| G16Y 30/10 | (2020.01) |
| H04L 43/065 | (2022.01) |

(52) U.S. Cl.
CPC ........... *H04L 63/029* (2013.01); *H04L 12/66* (2013.01); *H04L 43/12* (2013.01); *H04L 45/586* (2013.01); *H04L 49/552* (2013.01); *H04L 63/0272* (2013.01); *H04L 67/12* (2013.01); *G16Y 30/10* (2020.01); *H04L 43/065* (2013.01)

(58) Field of Classification Search
None
See application file for complete search history.

(56) References Cited

U.S. PATENT DOCUMENTS

| | | | | |
|---|---|---|---|---|
| 2003/0237016 | A1* | 12/2003 | Johnson | H04L 9/40 714/4.1 |
| 2005/0216729 | A1* | 9/2005 | Joels | H04L 43/0817 713/153 |
| 2005/0237982 | A1* | 10/2005 | Pankajakshan | H04W 12/03 370/352 |
| 2015/0003465 | A1* | 1/2015 | Saavedra | H04L 47/828 370/401 |
| 2015/0134418 | A1* | 5/2015 | Leow | G06F 16/29 705/7.34 |
| 2015/0312824 | A1* | 10/2015 | Thalanany | H04L 67/12 455/435.1 |
| 2016/0198003 | A1* | 7/2016 | Luft | H04L 67/63 709/225 |
| 2018/0191597 | A1* | 7/2018 | Nageshappa | H04L 43/20 |

(Continued)

*Primary Examiner* — William J. Goodchild
(74) *Attorney, Agent, or Firm* — DENTONS DAVIS BROWN PC; Matthew Warner-Blankenship; Kassandra Ricklefs

(57) ABSTRACT

The disclosure relates to an end-to-end private networking system. The system may include a private wide area network. The private wide areas network may allow for multi-tenancy. The private wide area network connects the tenants to an aggregation network core via a mobile data network. The aggregation network core is in turn in secure communication with one or more distributed servers via a secure tunnel or other secure connection.

20 Claims, 13 Drawing Sheets

(56) References Cited

U.S. PATENT DOCUMENTS

2019/0158397 A1\* 5/2019 Liu .................... H04L 45/64
2020/0235990 A1\* 7/2020 Janakiraman ....... H04L 41/0816
2021/0099360 A1\* 4/2021 Parsons ................ H04L 63/062

\* cited by examiner

APPARATUS, SYSTEMS AND METHODS FOR MULTI-CARRIER AND MULTI-TENANT END-TO-END PRIVATE WIDE AREA NETWORK

CROSS-REFERENCE TO RELATED APPLICATION(S)

This application claims the benefit under 35 U.S.C. § 119(e) to U.S. Provisional Application 62/798,561, filed Jan. 30, 2019, and entitled "Apparatus, Systems and Methods for Multi-Carrier & Multi-Tenant End-To-End Private Wide Area Network", which is incorporated herein by reference in its entirety for all purposes.

TECHNICAL FIELD

The disclosure relates to various devices, systems, and methods relating to the end-to-end private networking of devices via secure, private Wide Area Networks (WAN). Various implementations may be applied to 4G/5G, satellite, MPLS, and hybrid combinations of multi-carrier private WAN with, or in conjunction with, traditional broadband.

BACKGROUND

As companies deploy 4G mobile device connectivity a VPN connection is established from the remote device to a centralized VPN concentrator. The mobile device then communicates back to the primary location over this VPN connection. With this architecture there is a burden of data overhead to establish and maintain the VPN connection no matter if it is carrying data or not. Since cellular data is expensive this VPN overhead is undesirable.

Further, it takes time and additional data to negotiate the VPN tunnel, so as mobile 4G users are driving at highway speeds, the cellular signal may drop out and the VPN tunnel will fail. When connectivity is re-established, the VPN will re-connect. The result of this is that connections which rely on a VPN are more fragile and more susceptible to outages caused by cellular signal dropouts.

As such, there is a need in the art for technologies to improve and create more stable private WANs.

BRIEF SUMMARY

Various implementations provide desirable technical improvements for companies/organizations that are on-the-go, static, fixed and/or a mixture thereof and need a private centralized network (to access Intranet resources such proprietary systems, collaboration tools, file storage, and/or other systems as would be recognized by those of skill in the art) but which do not necessarily require access to the public Internet.

Various implementations provide desirable technical improvements for companies/organizations that desire people or business locations to have full, limited, filtered, and/or inspected access to the public Internet but want to reduce cost and network complexity by increasing centralized security, monitoring, and logging. In normal connectivity, enterprise customers typically have many locations connected to the Internet, and have an associated security boundary which includes a firewall for each remote location. In the disclosed architecture the number of Internet connections is reduced to only one which substantially reduces the attack surface of the organization where connections are exposed to the public Internet.

Certain Examples relate to a secure, multi-tenant private WAN system comprising a network having at least one mobile connection, an aggregation network comprising isolated virtual routers constructed and arranged to isolate a plurality of private WAN networks. In some implementations, the plurality of private WAN networks are constructed and arranged to utilize multi-carrier private WAN connections and seamlessly integrate them to provide connection redundancy for outlying sites.

Some implementations provide the ability to construct a system which is scalable utilizing virtual routing and forwarding to allow multiple customers to share a common network core without the need to build discrete systems of physical devices for each customer.

Certain implementations provide the ability to monitor and test each private network connection to ensure that it is working and operational and report the status of all connections in a single dashboard.

Further implementations may provide the ability to gather usage information from private networks, such as 4G, 5G, LTE, and/or Low Earth Orbit (LEO) data usage information. In various of these implementations, the usage information is displayed on one or more dashboards. In still further implementations, the system is configured to generate data usage alerts.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One Example includes An end-to-end private networking system, including a private wide area network including two or more tenants, a network core, and a distributed network, wherein the two or more tenants are connected to the network core via at least one mobile data network, and the private wide area network is in communication with the distributed network via a secure tunnel in communication with the network core and the distributed network. Other embodiments of this Example include corresponding computer systems, apparatus, and computer programs recorded on one or more computer storage devices, each configured to perform the actions of the methods.

Various implementations of this Example may include one or more of the following features. The system where the network core includes a network aggregator, a monitoring platform, and one or more virtual routers. The system where the distributed network includes at least one firewalled connection to public internet. The system where the at least one mobile data network connects the two or more tenants to the network core via at least one of a 4G, 5G, LTE, or low earth orbit satellite connection. The system further including at least two mobile data networks where the tenants are configured to failover between the at least two mobile data networks. The system further including at least one firewall between the private wide area network and a public internet connection. The system where at least one of the two tenants or more is an Internet of Things (IoT) device. Implementations of the described techniques may include hardware, a method or process, or computer software on a computer-accessible medium.

A second Example includes A method for providing a secure, private end-to-end networking including: providing at least one tenant on a secure wide area network (WAN), connecting the at least one tenant to a router cluster and an aggregation network, sorting and filtering traffic from the at least one tenant via at least one route map on the aggregation network, and egressing traffic from the aggregation network to a distributed network via a secure conduit. Other embodiments of this Example include corresponding computer systems, apparatus, and computer programs recorded on one or more computer storage devices, each configured to perform the actions of the methods.

Various implementations of this Example may include one or more of the following features. The method where traffic is egressed to the distributed network via a virtual router in communication with the secure conduit. The method further including egressing traffic via the virtual router to public internet. The method where the distributed network includes a firewall and a server. The method where the at least one tenant is connected to the router cluster and aggregation network via at least one of a 4G, 5G, LTE, low earth orbit satellite connection. The method where the router cluster and aggregation network are integral. The method further including monitoring data usage and WAN connectivity and health metrics via a monitoring platform in communication with the aggregation network. Implementations of the described techniques may include hardware, a method or process, or computer software on a computer-accessible medium.

A third Example includes A method for providing end-to-end private networking via a private wide area network (WAN) including: connecting at least one tenant to an aggregation network, where the at least one tenant generates traffic, routing traffic through the aggregation network via a router cluster applying at least one route map, egressing traffic to a distributed network via a secure conduit, and routing traffic to a monitoring platform, where the monitoring platform is in operable communication with the aggregation network. Other embodiments of this Example include corresponding computer systems, apparatus, and computer programs recorded on one or more computer storage devices, each configured to perform the actions of the methods.

Various implementations of this Example may include one or more of the following features. The method further including gathering data usage information and displaying it on a dashboard. The method further including generating data usage alerts. The method where the secure conduit is a virtual private network (VPN) connection. The method further including egressing traffic from the aggregation network to public internet via at least one firewalled gateway. The method where the at least one tenant includes more than one mobile device. Implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
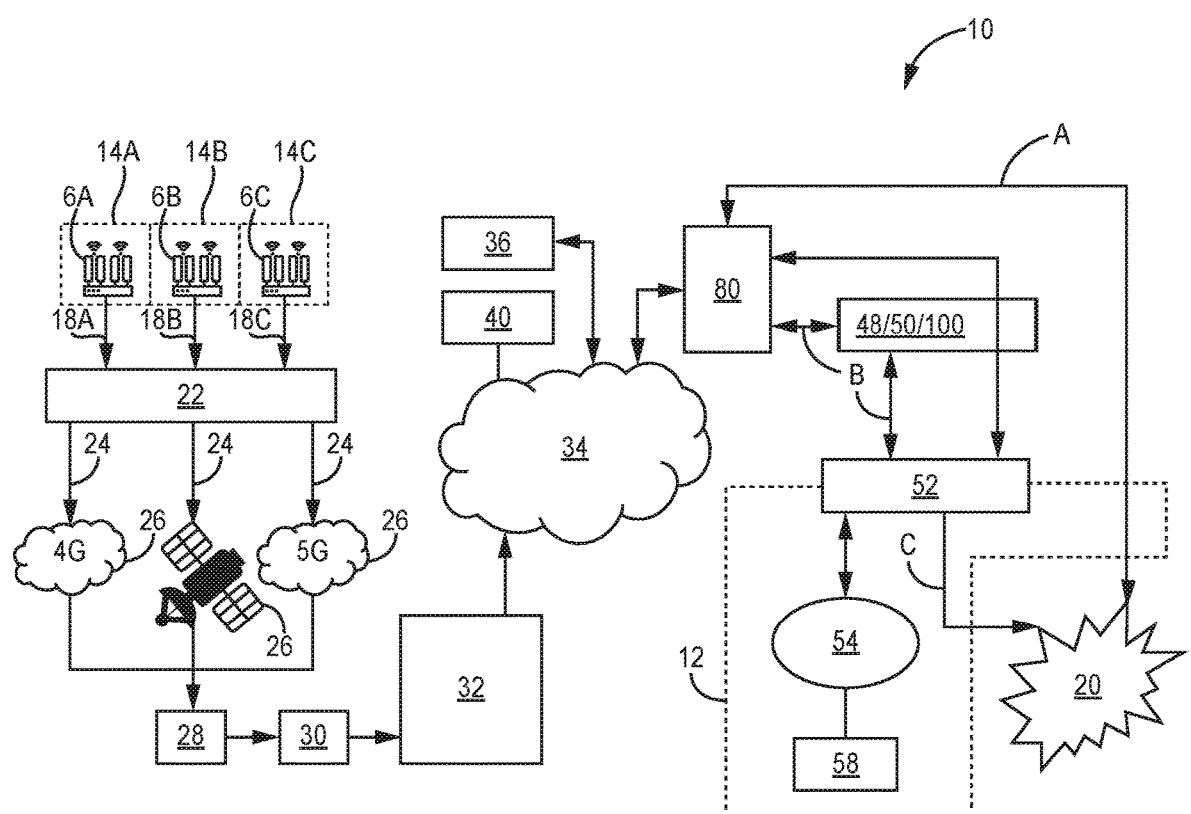
FIG. 1 is a schematic depiction of the system, according to one implementation.

The various embodiments disclosed or contemplated herein relate to devices, systems and methods relating to the end-to-end private networking of devices via one or more secure, private Wide Area Networks ("WAN"). The system represents a technical improvement in that the system provides the ability to gather data usage information from multiple connections and multiple carriers and display this information in a single dashboard. Further, the system is configured to provide data usage alerts that summarize data usage across multiple carriers and across time zones.

The disclosed implementations allow users to utilize one or more carriers across various geographic locations to provide seamless coverage. Further, the use of multiple carriers provides redundancy and therefore more stable coverage. As such, the system is configured to utilize secure, multi-carrier connectivity.

Various implementations allow for the ability to sort, filter, and firewall traffic by customer/user and ensure that traffic remains segregated. The system thereby supports multiple segregated customers/users and secure connection routing or secure multi-tenancy on the system.

According to various implementations, the end-to-end private system disclosed herein may be used in several environments and differs from traditional broadband, where traffic is routed directly to/from the various points along the WAN as well as the public internet.

The figures depict an end-to-end private networking system 10, where traffic is placed on a secure WAN 12 that is isolated and separate from the public internet 20. The WAN 12 traffic may, according to certain implementations, connect to various distributed networks 54 via the establishment of a secure conduit 100 or tunnel 100, such as via a VPN connection, as is shown in various implementations throughout the figures.

As described herein, these implementations of the system 10 utilize secure single- or multi-carrier mobile networks 26 and a variety of physical and/or virtual components to route packets and/or traffic to specified IP addresses while avoiding traversing the public internet 20. In some implementations, the system 10 provides the ability for multi-tenant private WANs 12.

In various implementations, the multi-carrier mobile data networks 26 may utilize failover connectivity such that individual tenants/users 14 on the system 10 can operate at numerous discrete locations via wireless or wired connections 18, 24 to access the secure WAN 12. In certain implementations, the tenants 14 may directly connect to distributed networks 54 and/or remote servers 58 via secure and stable VPN connections 100, whereby data traffic is securely routed via route maps 4 and/or IP sorting, as described herein.

FIGS. 1-13 depict various implementations of the system 10 architecture having multiple components and configurations. As would be understood, various components of the system 10 are optional and may be implemented in myriad configurations. It is understood that these implementations provide a private WAN 12 that connects one or more tenants 14 over a private network that does not directly connect or otherwise egress to the public internet 20. Of course, connection or egress to the public internet 20 is possible as is explained herein. It is understood that various of these described components are each operable without the others, and in no way are representative of the only possible configuration or set of required components to operate the system 10.

Figure 2:
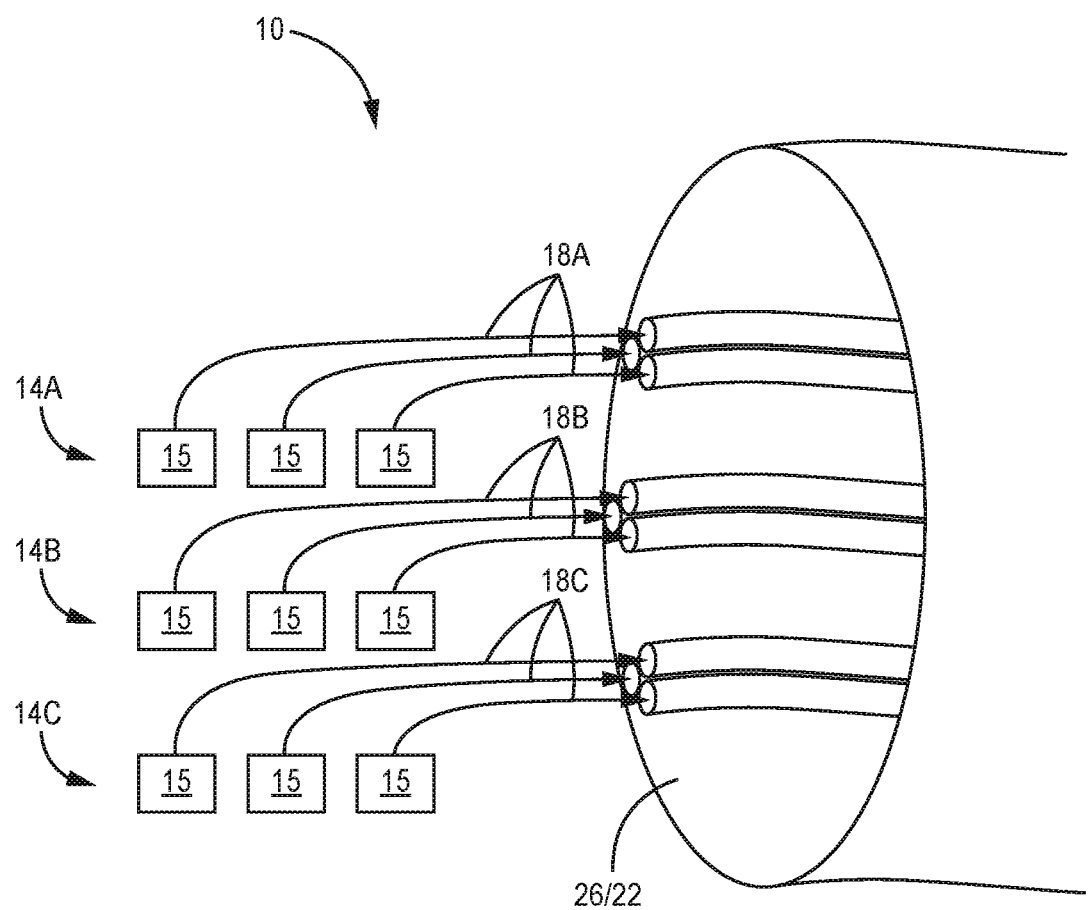
FIG. 2 is a schematic depiction of tenant LANs connected to a wireless carrier, according to one implementation.

In some implementations, each tenant 14A, 14B, 14C includes one or more devices 15, as shown in FIG. 2. In certain implementations, the tenants 14A, 14B, 14C provide connectivity to several devices 15 via VLAN or other solutions as would be recognized by those of skill in the art. In various of these implementations, each device 15 is connected to a mobile data network 26 via wireless connection 18A, 18B, 18C, as will be discussed further below. In some implementations, the devices 15 may be mobile devices such as a cell phone or laptop.

FIGS. 1-13 depict various implementations of the end-to-end private networking system 10 where one or more tenants 14A, 14B, 14C operate along the private WAN 12. As shown, for example, in FIG. 1, in certain of these implementations, any of these tenants 14A, 14B, 14C may have failover connections 6A, 6B, 6C which are able to access alternate carriers 26 via private connections. In various implementations, the primary connection 18A, 18B, 18C and/or failover connection 6A, 6B, 6C may be a 4G, LTE, 4G/5G, low earth orbit ("LEO") satellite or other wireless connection as would be appreciated by those of skill in the art.

In various implementations, the tenants 14A, 14B, 14C access a mobile data network 26 via a private radio access network(s) ("RAN") 22. According to certain of these implementations, the RAN 22 in turn has a further wireless or wired connection 24 to the mobile data network 26.

According to various implementations, multiple tenants 14A, 14B, 14C can be operating via failover connections 6A, 6B, 6C or simply on separate carriers 26 within the system 10. This failover connectivity has been described previously in U.S. application Ser. No. 15/789,554, filed Oct. 20, 2017 and is hereby incorporated by reference in its entirety. For example, if one mobile data network 26 is down or the connection 24 to that network 26 fails, the system 10 may trigger the tenant 14 to failover to a secondary mobile data network 26 via a failover connection 6A, 6B, 6C to maintain connectivity.

In various implementations of the system 10, each of the tenants 14A, 14B, 14C may be part of the same organizational system. For example, each tenant 14A, 14B, 14C may be a discrete location (such as a gas station) which are in turn in private, electronic communication with a single private network 54 and/or server 58 (such as a private corporate network).

Figure 3:
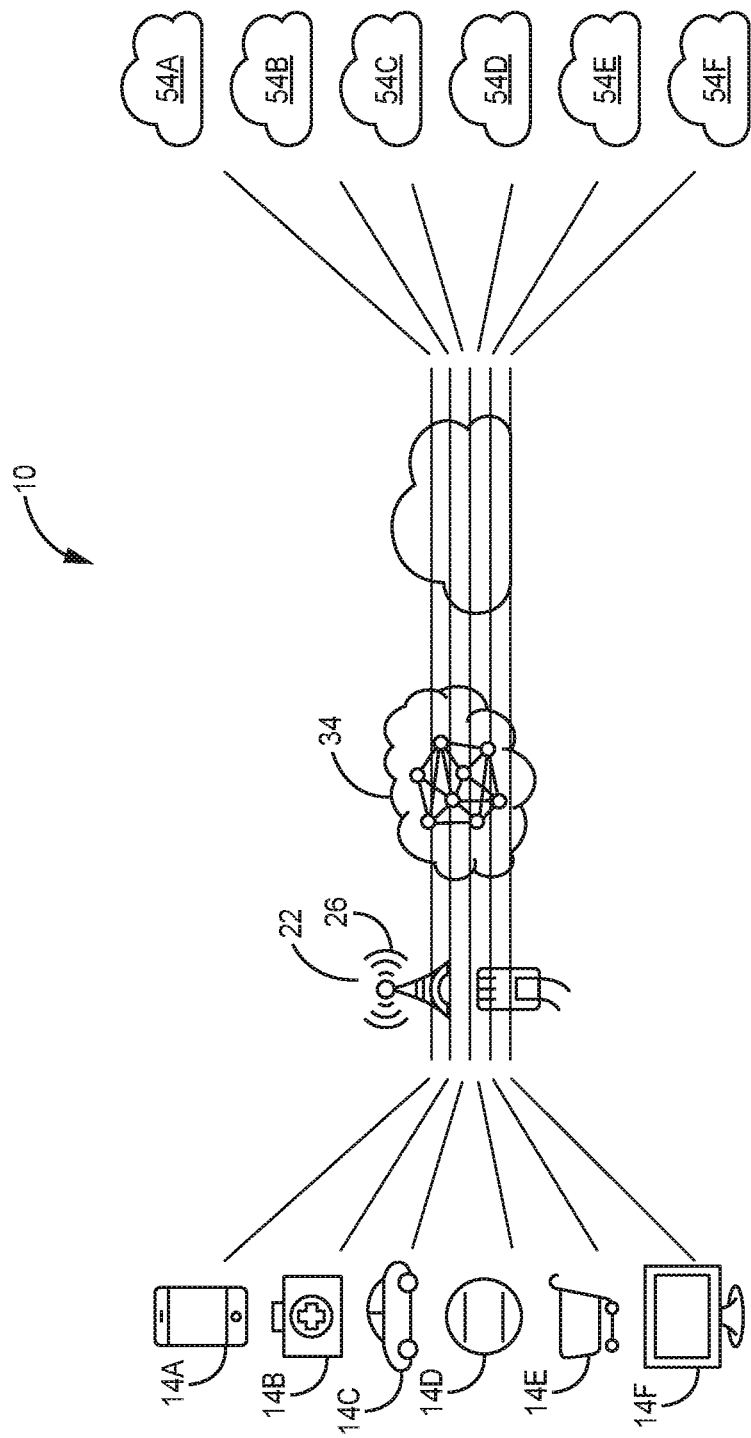
FIG. 3 is a schematic depiction of the system, according to one implementation.

Alternatively, the tenants 14A, 14B, 14C may include a number of distinct users/customers for the system 10. For example, one tenant 14A may be a delivery driver, another tenant 14B may be law enforcement personnel, and the like. In either case, each tenant 14A, 14B, 14C is in private, secure communication with its corresponding distributed network 54 and/or servers 58. FIG. 3 shows the system 10 connecting each tenant 14A, 14B, 14C, 14D, 14E, 14F with its distinct, distributed networks 54A, 54B, 54C, 54D, 54E. It is understood that these implementations are generally referred to herein as secure "multi-tenant" networking systems.

Turning back to FIG. 1, various implementations of the system 10 allow secure connection(s) 18A, 18B, 18C from the various tenants 14A, 14B, 14C to an optional suite of network security services and various features thereof. For illustrative purposes, certain non-limiting examples of such features may include: traffic logging, automated reporting, traffic management, gateway antivirus, intrusion prevention, botnet detection, geographic blocking, APT (Advanced Persistent Threat) detection and blocking, content filtering, data loss prevention, reputation enabled defense, application control, SPAM filtering, DNS filtering, and the like as would be appreciated by those of skill in the art. As is understood, these features can be utilized at the points of egress and ingress across the WAN 12.

By providing connectivity for tenants 14A, 14B, 14C via secure, private connections 18A, 18B, 18C through the WAN 12, the system 10 eliminates the need for physical firewall hardware at every networked location while maintaining network security. Further, the system 10 reduces required bandwidth and improves reliability by removing the need for VPN connections over cellular network(s) 26 (also referred to herein a mobile data network 26 and wireless data networks 26). Additionally, the system 10 can provide Internet access while mitigating excessive data use by using centralized content filtering, whitelist filtering traffic, and/or rate limiting multiple users. These technical improvements are beneficial in the case of an outlying office and/or for mobile connectivity, but may become critical in the case of Internet of Things ("IoT") devices when they are connected to a private WAN 12.

It is appreciated that many implementations of the system 10 make use of virtual routing and forwarding ("VRF") technology such as via one or more virtual routers 80 and/or other components to enable the system 10 and methods described herein without necessarily providing discrete physical components. This represents a technical improvement in that it allows for a reduction in overall physical infrastructure and bandwidth use and provides the capability for multi-tenancy.

Continuing with FIG. 1, according to these implementations, the wireless data network(s) 26 further has an optional connection through a private network gateway 28, VPN 30, Wireguard®, or other secure connection as would be understood, to a router cluster 32. In various implementations, the router cluster 32 has redundant routing utilizing HSRP, GLBP, VRRP or other redundancy mechanisms with interface tracking. In implementations with redundant routing, the system 10 may include dual routers that have intra-cluster redundancy. Additionally, the routers within the router cluster 32 may be located at physically diverse locations to further improve reliability. Other implementations are of course possible.

In various implementations, the router cluster 32 is in electronic communication with an aggregation network(s) 34. It is understood that while the router cluster 32 and aggregation network 34 are depicted in various configurations, they are operationally integrated in receiving discrete tenant 14A, 14B, 14C traffic and facilitating the monitoring and controlling routing of that traffic along the WAN 12 to various destinations, such as distributed network(s) 54, the public internet 20, and elsewhere as would be understood.

In some implementations, the aggregation network 34 routes traffic via secure connections, such as established secure tunnels 100 described herein. In various implementations, one or more hosted customer virtual routers 80 are provided. In these and other implementations, the aggregation network 34 parses out the traffic for each individual customer/tenant 14A, 14B, 14C prior routing, via virtual router 80, the traffic through the secure connection 100, VPN gateway 48, or VPN 50. In some implementations, the aggregation network 34 may include a wired connection to the distributed network 54, for example in cases where the distributed network 54 is co-located with the aggregation network 34.

In some implementations, the virtual router 80 may connect the aggregation network 34 directly to the public internet, shown at reference arrow A. In another implementation, the virtual router 80 connects the aggregation network 34 to a customer firewall 52 via a secure connection 100, such as a VPN 50 and optional VPN gateway 48, shown at reference arrows B. The customer firewall 52 may then be in communication with the distributed network 54 and associated servers 58. In further implementations, the customer firewall 52 is in communication with the public internet 20 via a firewalled and secure gateway, shown at reference arrow C.

The aggregation network 34, according to these implementations, is optionally in operable communication with one or more domain name systems ("DNS") 36 to facilitate routing and the provision of public and/or private IP addresses, as is discussed in detail below.

Further, in some implementations, the aggregation network 34 is optionally in communication with, or includes, a monitoring platform 40, as will be discussed further below.

Continuing with the controlled routing of the multi-tenant system 10, it is understood that in various implementations, each of the tenants 14A, 14B, 14C are assigned a specified range of IP addresses. In some alternative implementations, tenants 14A, 14B, 14C do not utilize continuous IP ranges. In some implementations, tenants 14A, 14B, 14C utilize discrete IP addresses or multiple IP address ranges.

Figure 4:
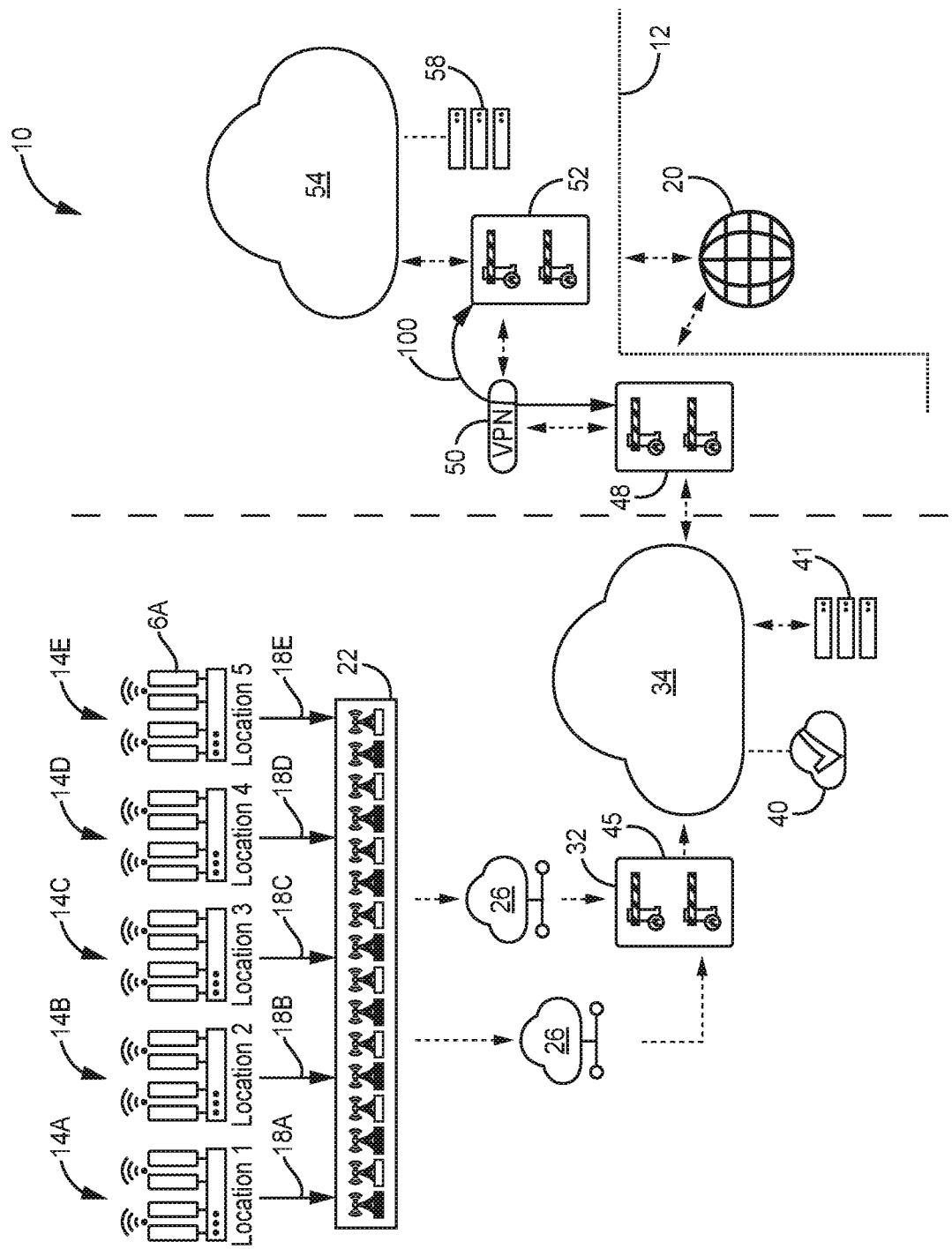
FIG. 4 is a schematic depiction of the system, according to one implementation.

FIG. 4 depicts an alternative implementation of the system 10. In some implementations, the router cluster 32 includes one or more aggregation service routers (ASR) 45. In these and other implementations the ASR 45 utilizes IP routing to maintain tenant 14A, 14B, 14C traffic isolation, as will be discussed further below. Further, in these and other implementations, the aggregation network 34 is in communication with one or more hosted servers 41. In some implementations, the hosted server(s) 41 provide local operations required by the individual tenants 14A, 14B, 14C.

In various implementations, the connections 18A, 18B, 18C, 18D, 18E may include channel slicing. In some implementations, the connections 18A, 18B, 18C, 18D, 18E may include dual 4G connections, dual 5G connections, and/or dual network slice connections.

In further implementations, the system 10 may utilize narrowband IoT (NB-IoT), LTE-M (Machine Type Communication), Low Power WAN (LP-WAN), LoRaWAN®, and other technologies, as would be appreciated, for communication between various segments of the system 10. In some implementations, the system 10 may utilize NB-IoT, LTE-M, LP-WAN, LoRaWAN® or other technology as an alternative to, in tandem with, on top of, as a supplement to and/or in conjunction with various other connectivity mechanisms described herein, such as 4G, 5G, and LTE connections.

In various implementations of the router cluster 32 and aggregation network 34, as shown in FIGS. 5-8, the system 10 routes traffic via IP addresses (in some implementations as assigned by wireless carriers 26) to segment the traffic and control the universe of possible destinations for that traffic. In certain of these implementations, decision processes are applied to traffic arriving at reference point(s) 2A on the ASR 45 cluster 32 from the mobile data network 26. In some implementations, the traffic arrives at the ASR 45 cluster 32 via the aggregation network 34. Additionally, decision processes may be applied to traffic leaving the ASR 45 cluster 32 at reference point(s) 2B.

Figure 8:
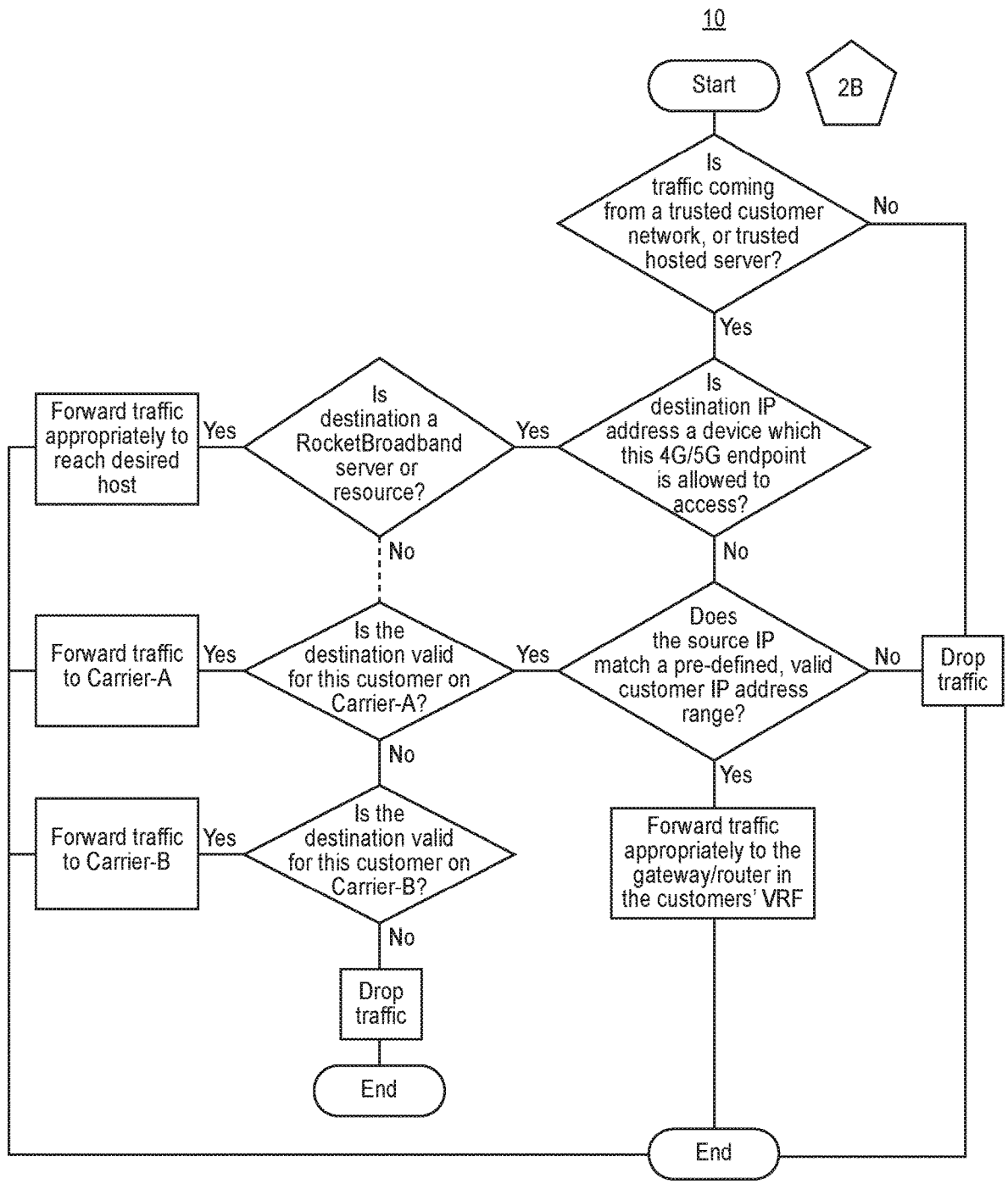
FIG. 8 is a flow chart showing traffic routing, according to one implementation.
Figure 9:
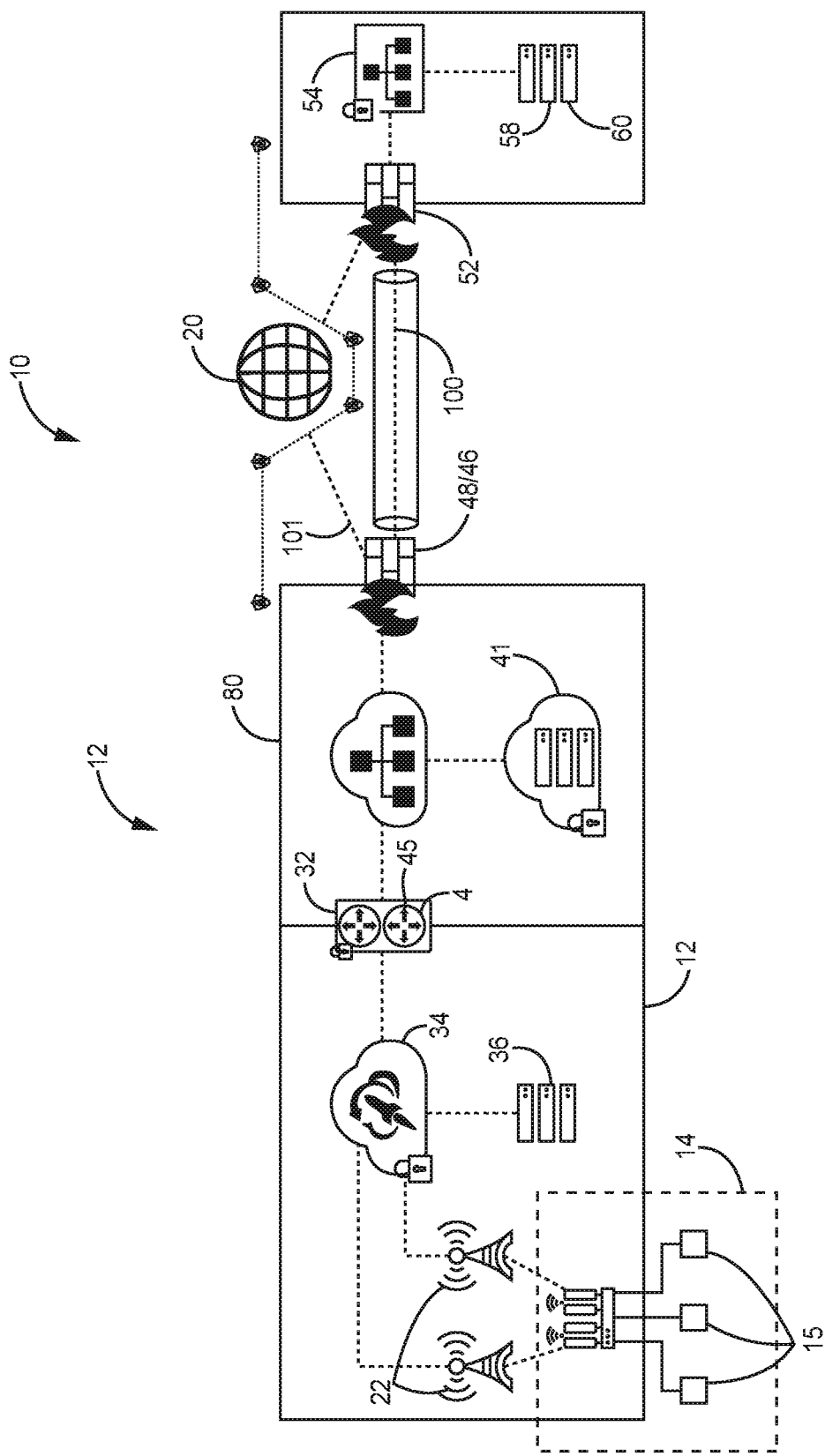
FIG. 9 is a schematic depiction of the system, according to one implementation.

In various implementations, the system 10 monitors and/or inspects traffic at various points along the egress and ingress points 2A, 2B. It is understood that in various implementations, an access control list ("ACL") inspects traffic packets and controls filtering. For example, if the packet traffic does not match one of the defined targets on the WAN 12, it can be dropped, routed, or forwarded to a customer gateway which resides on a separate virtual router. It is understood that in certain implementations, a virtual router running on the ASR 45 cluster 32 can be configured to execute these rules. FIGS. 8 and 9 show exemplary decision processes that may be implemented at egress and ingress points 2A and 2B.

Turning back to FIGS. 5 and 6, in some implementations, route maps 4A, 4B are utilized on the ASR 45 and are configured to monitor traffic IP addresses and route that traffic according to established rules. For example, in some implementations, the IP addresses of origin and destination are utilized to route the traffic to the appropriate and regulated destination. It is understood that in these implementations, unique processes may be required for each individual mobile data network 26 and/or customer/tenant 14A, 14B, 14C.

Figure 5:
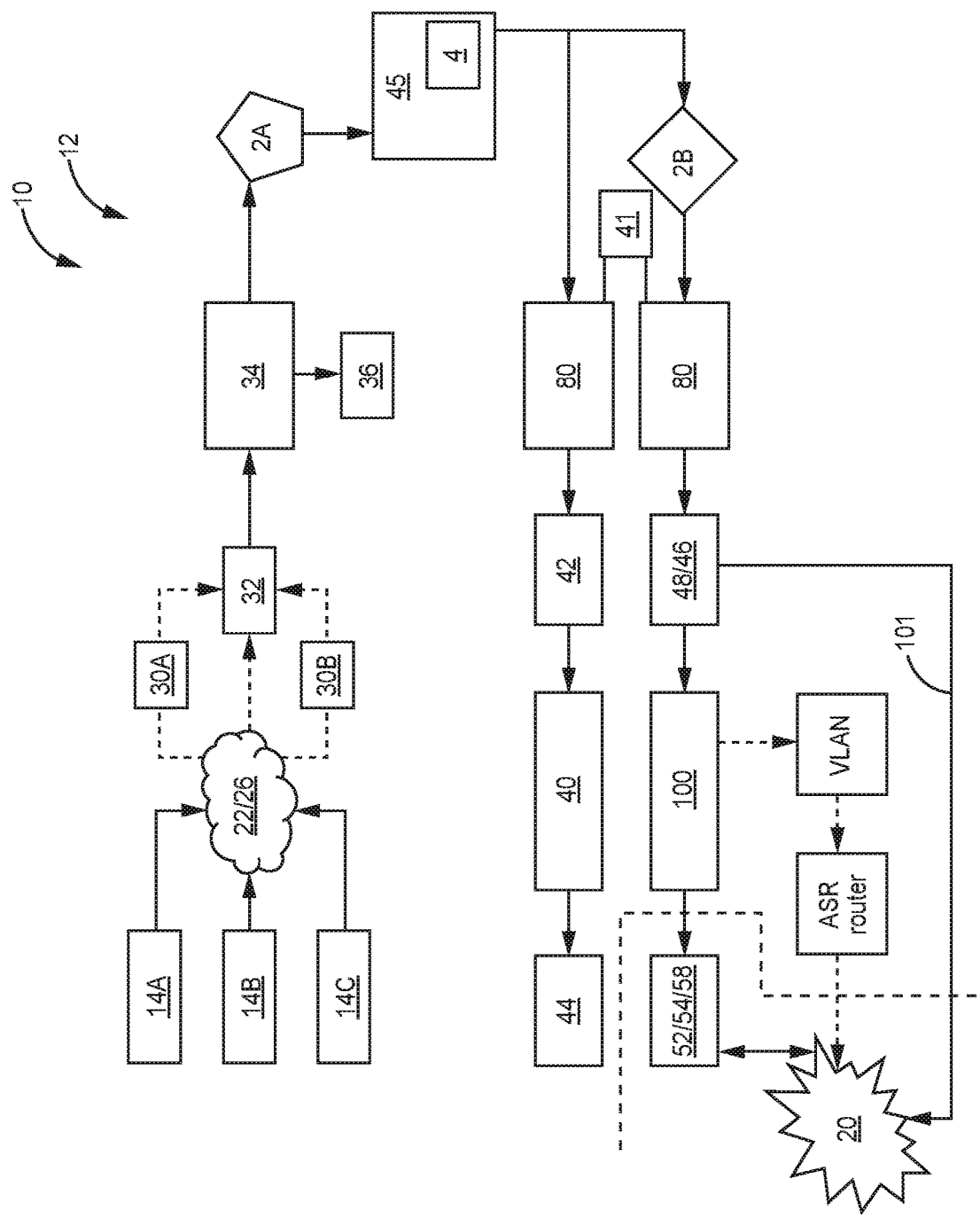
FIG. 5 is a schematic depiction of the system, according to one implementation.
Figure 6:
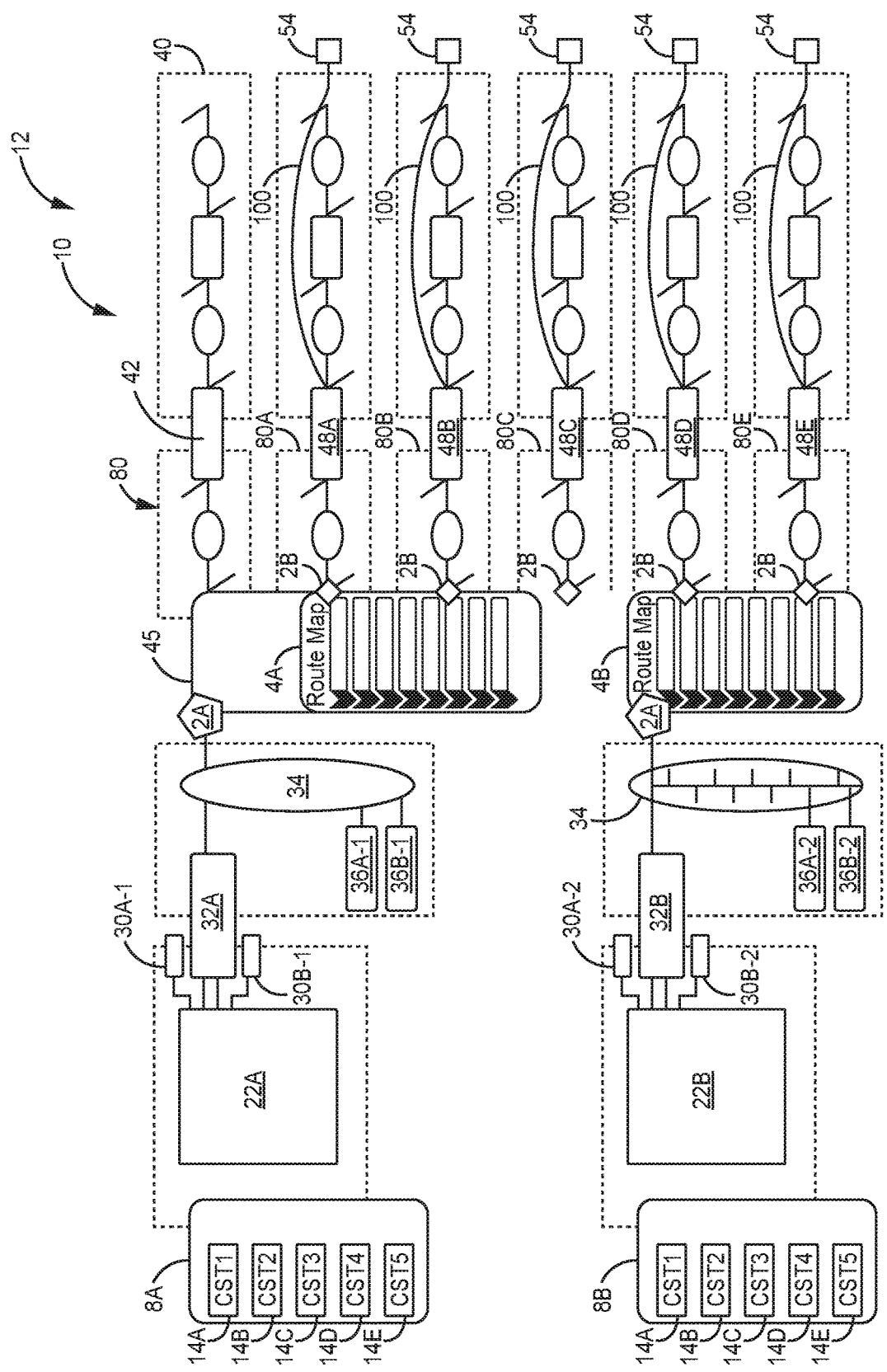
FIG. 6 is a schematic depiction of the system, according to one implementation.
Figure 7:
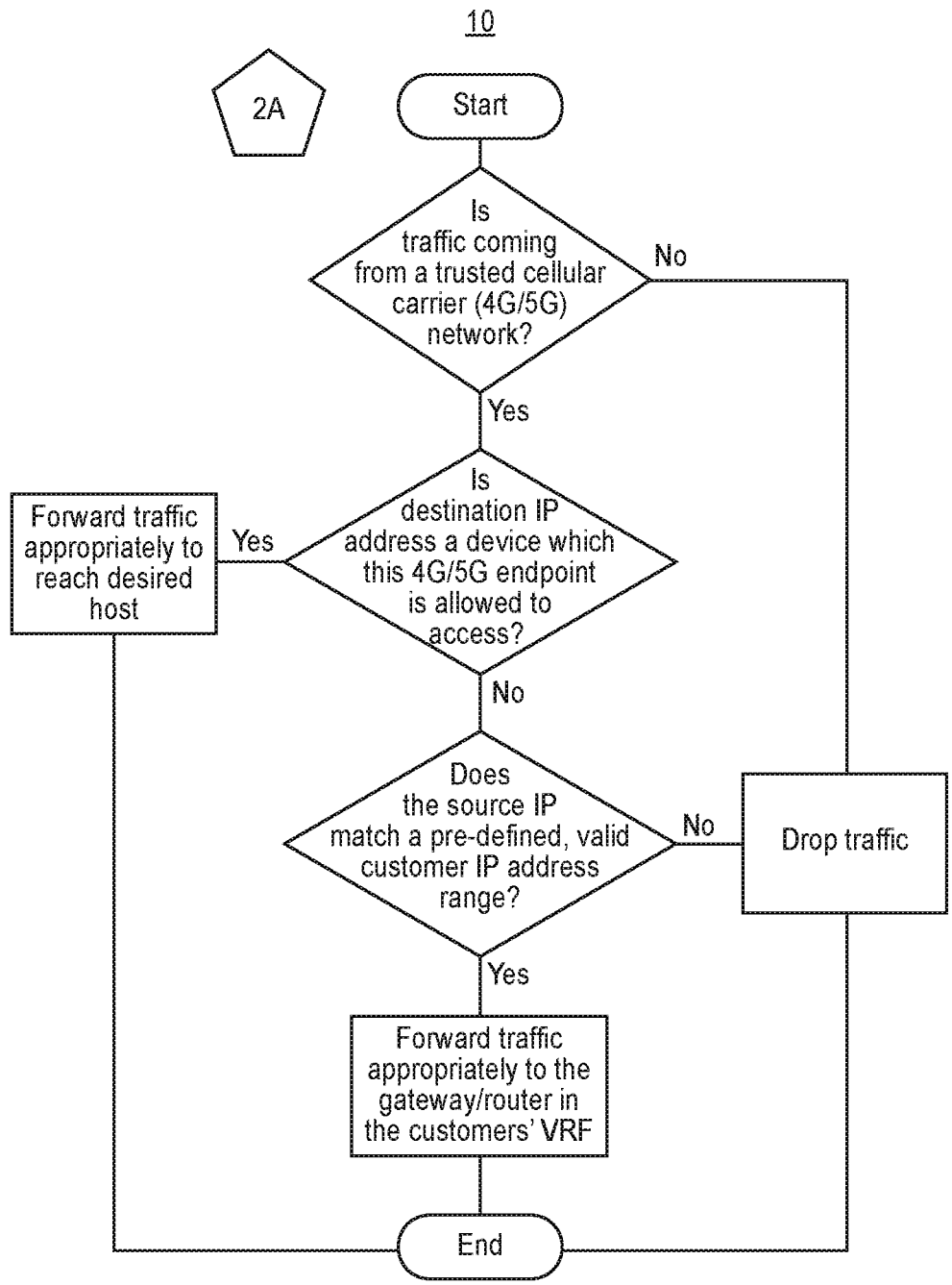
FIG. 7 is a flow chart showing traffic routing, according to one implementation.

Therefore, and as is shown in the implementations of FIGS. 5 and 6, it is understood that the network core, including the aggregation network 34, ASR 45, and router cluster 32, is a point where all traffic from all tenants 14A, 14B, 14C arrives to be sorted and classified. In some of these implementations, the traffic is sorted and classified utilizing a route map 4 and source IP addresses and may be sent via VRF.

It is also understood that the system 10 can optionally also provide private connectivity of the aggregation network 34 with a monitoring platform 40. In some implementations, the aggregation network 34 is in communication with the monitoring platform 40 via VRF executed on the ASR 45. In some implementations, the aggregation network is in operational communication with the router cluster 32. In these implementations, the system 10 can provide monitoring of each connection across multiple carriers 26 without the requirement for an internet 20 connection. The monitoring platform 40 will be discussed further below.

As shown in FIGS. 5 and 6, in certain implementations, the system 10 can optionally also provide a private, secure connection or tunnel 100 between the aggregation network 34 and a distributed network 54. In certain implementations, traffic is routed via a hosted customer virtual router(s) 80, 80A, 80B, 80C, 80D, 80E, hosted firewalls 46, and/or VPN gateways 48A, 48B, 48C, 48D, 48E through a VPN tunnel 100 to a remote gateway or corporate firewall 52 and distributed network 54, such as at a corporate headquarters. In exemplary implementations, the distributed network 54 may optionally have a customer firewall 52, as well as secure servers 58 and/or databases 60. In further implementations, the distributed network 54 is in communication with the public internet 20.

In various implementations, the tenants 14A, 14B, 14C, 14D, 14E are in communication with carrier RANs 22A, 22B. In various implementations, the RANs 22A, 22B have one or more VPN connections 30A-1, 30A-2, 30B-1, 30B-2 in communication with the virtual routers 32A, 32B. In further implementations, the RANs 22A, 22B are in communication with the virtual routers 32A, 32B via an alternative tunnel mechanism, such as a GRE tunnel, a MPLS protocol, wired connection, or other supported protocol as would be appreciated by those of skill in the art.

In some implementations, the system 10 optionally includes a domain name system ("DNS") 36, 36A, 36B. Optionally, when the mobile data network 26 distributes connection information to a client device 15 or tenant 14 over private connections 18 the mobile data network 26 sends down to the system 10 DNS 36A, 36B server addresses, so a user is able to use those defaults if desired. In some implementations, a user is able to use alternative DNS 36A, 36B servers. The use of centralized DNS 36A, 36B servers are well understood to be beneficial in preventing DNS poisoning attacks. Since these DNS 36A, 36B servers are visible to client locations over the WAN 12, security is improved. It would be appreciated that while this configuration is illustrative, many other implementations and/or configurations are possible.

In various implementations, the system 10 is configured to support a diverse customer base with varied connectivity needs. The system 10 is engineered to reduce bandwidth by filtering traffic in the core of a network. As shown in the implementations of FIG. 9, devices 15 may be able to gain access to the internet 20 via the core of the WAN 12, via secure connection 101. In alternative implementations, the system 10 may route all traffic to the distributed network 54 where it can be inspected before being allowed to access the public internet 20. In some implementations, the secure connections 100, 101 (such as VPN tunnels 100) may be configured such that traffic can be routed in either way.

Continuing with FIG. 9, the system 10, private WAN 12, and optional tunnel 100 provide numerous advantages. The private WAN 12 system 10 connectivity can eliminate the need to build and maintain the VPN connection from each tenant 14 and/or tenant device 15. When implemented with the disclosed system 10 when the devices 15 are traveling down the road connectivity can be maintained via multi-carrier connectivity, and if/when connectivity completely drops connections are reestablished much more quickly due to the fact that VPNs are not needed from each individual connected device 15. Further, in some implementations, VPN connection, if necessary, are built from the core of the network 12 which is stable and is not susceptible to the connection dropout problems encountered by mobile devices 15.

Optionally, the system 10 can provide a firewalled gateway connection 101 to the public internet 20. It is understood that in operation, the aggregation network 34 is constructed and arranged so as to interconnect the various locations on the WAN 12. In some implementations, the aggregation network 34 may or may not be allowed to access to the public internet 20 at any point between various components of the system 10. These implementations provide access to distributed network(s) 54 without introducing extraneous threats and while avoiding network security events and vulnerabilities.

In some implementations, the system 10 and ASR 54 uses a route map(s) 4 and IP address routing to achieve isolation of individual tenant 14A, 14B, 14C traffic. In certain implementations, SIM cards, virtual SIMs, satellite access cards, and other platforms are assigned to tenants 14A, 14B, 14C, as would be understood. In these implementations, IP addresses are bound to the assigned tenants 14A, 14B, 14C thereby placing them into logical groups.

Within the mobile data networks 26 and also on the RAN 22, each individual connection 18, 24 is typically isolated from all other connections 18, 24. As discussed above the connections 18, 24 connect the tenants 14 and devices to the router cluster 32 and ASR 45 where a route-map 4 is applied to classify traffic from different tenants 14, and where this traffic is forwarded to the virtual router 80 for the customer.

In situations where VPN connections link these private WAN 12 connected devices 15 back to a central (corporate) site 54 via one or more VPN connections 100, traffic returning from the central site 54 being sent to the remote devices 15 must be inspected to ensure that tenants 14A, 14B, 14C are isolated from each other. This action is performed using a route map 4 and/or access control list(s) applied to traffic as it is sent to the core of the network 12.

Figure 10:
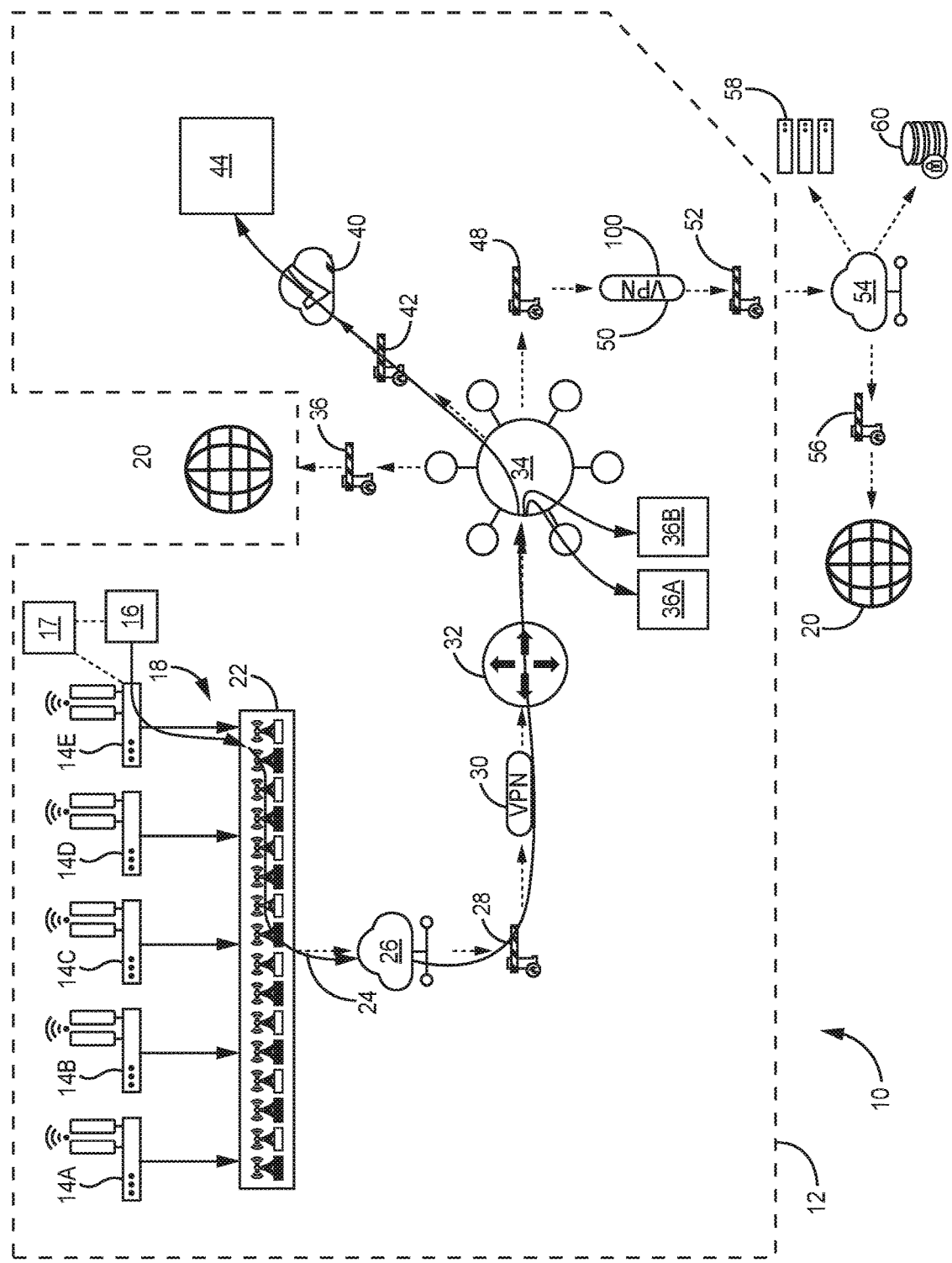
FIG. 10 is a schematic depiction of the system, according to one implementation.
Figure 11:
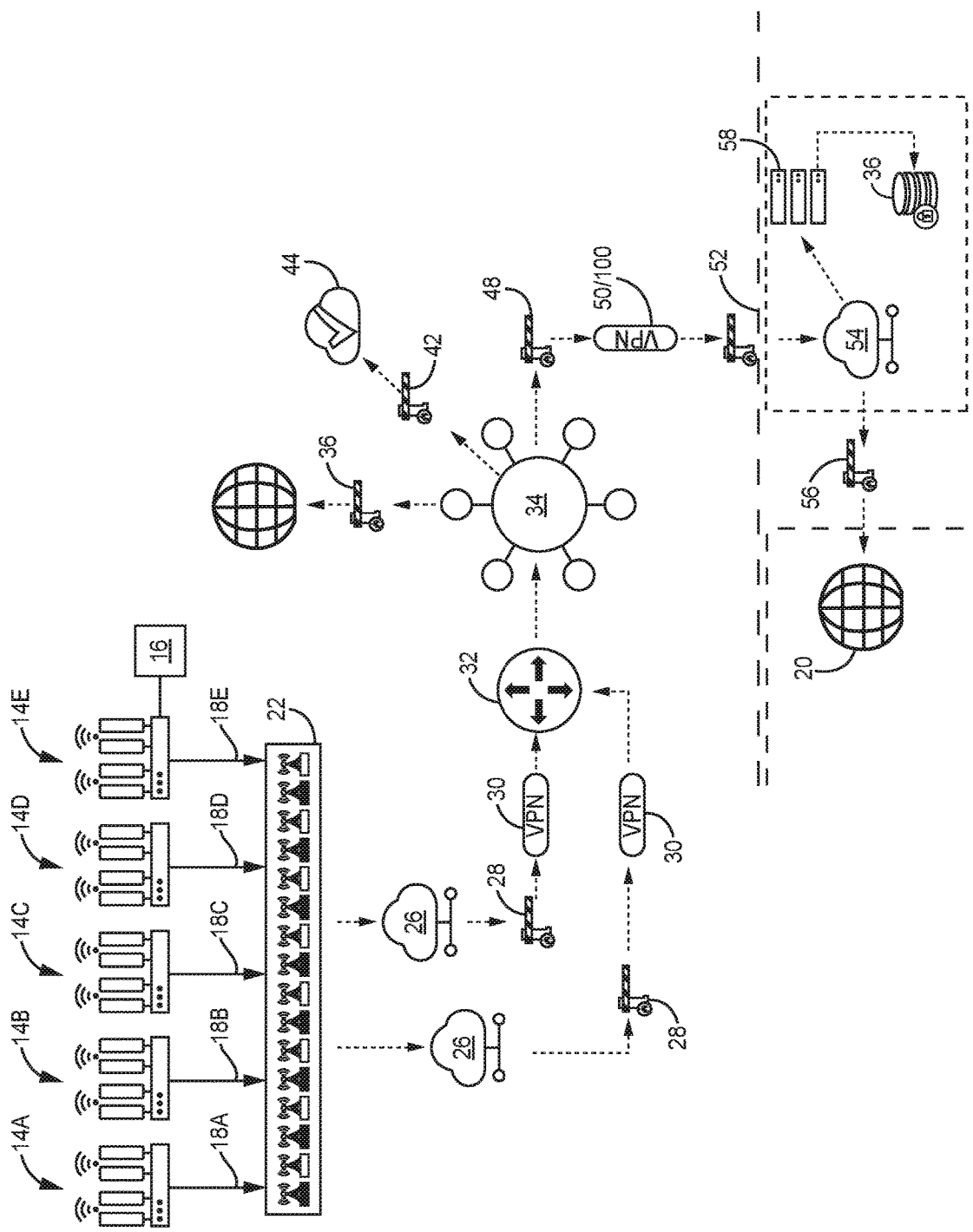
FIG. 11 is a schematic depiction of the system, according to one implementation.

In certain implementations, certain IP addresses can be reserved for testing and maintenance. Turning to FIGS. 10 and 11, certain traffic may be routed to a monitoring server 44. It is appreciated that in certain implementations, rather than utilizing several physical routers, the system 10 operates in front/behind/in the middle of traffic on a virtual cluster of routers.

In various implementations, the user has multiple connections from each tenant 14A, 14B, 14C, 14D, 14E, carrying traffic over independent mobile data networks 26 and then consolidating and sending information out to the customer's distributed network 54. It is understood that in these implementations, the traffic never egresses to the public internet 20 because it is all routed within the private, secure WAN 12.

Figure 12:
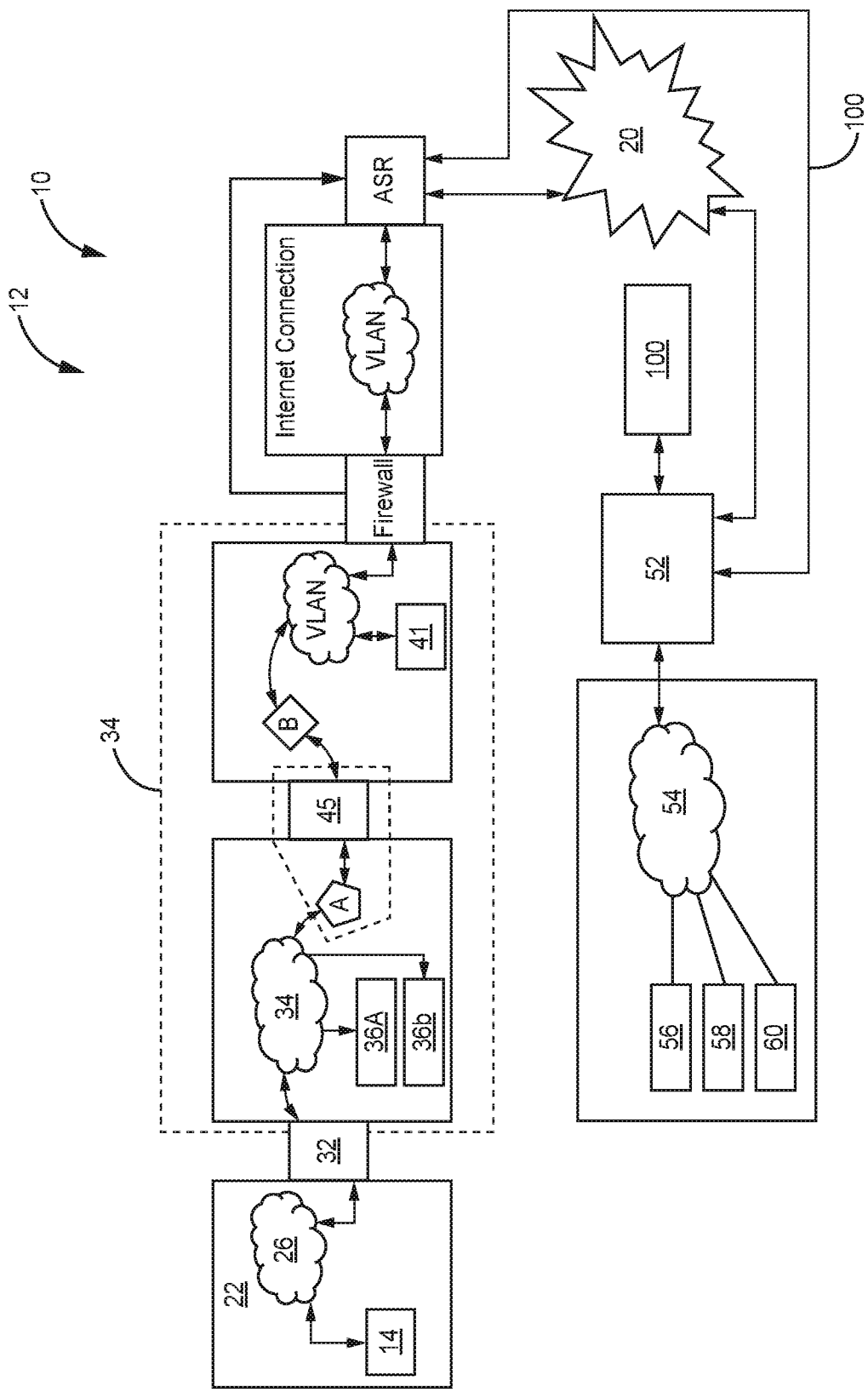
FIG. 12 is a schematic depiction of the system, according to one implementation.

It is further understood that VLANs provide layer-2 isolation of network segments. Virtual routers provide layer-3 isolation of network segments. This ensures that traffic cannot crosstalk between tenants 14A, 14B, 14C maliciously or accidentally. In various implementations, the system 10 provides layer-3 isolation in the customer aggregation networks 34 and both layer-2 and layer-3 isolation in the virtual routers between customers in a multi-tenant configuration for secure private WAN, as is shown in FIG. 12.

In various implementations, the hosted servers 41 are behind a firewall and, if desirable, do not egress to the public internet 20. As shown in FIG. 12, in implementations, the servers 41 and/or applications may be hosted and not traverse over another VPN back to the customer distributed network 54.

The system 10 represents a technical improvement in that the way that user traffic is shaped to deliver advantages when it comes to data consumption and content filtering. In certain implementations with custom specifications, traffic is carried back to the WAN 12 via redundant carrier VPN connections via discrete mobile data networks 26, such as wireless carrier networks. This dual-carrier capability allows secure user access via wireless carrier networks 26 to deliver seamless connectivity and coverage.

As is shown in FIGS. 10 and 11, the tenants 14A, 14B, 14C, 14D, 14E may be in operational communication with a probe 16. The probe 16 may optionally be constructed and arranged to provide useful data to the monitoring system 40 regarding the tenants 14A, 14B, 14C and/or WAN 12 connection health, as previously described and embodied in the incorporated references.

In various of these implementations, the probe 16 is optionally constructed and arranged or otherwise configured for validating the operational status of the WAN 12 path from a tenant 14A, 14B, 14C, 14D, 14E, through the RAN 22, through the wireless data network 26, into the router cluster 32, through the customer aggregation networks 34, and optionally out to monitoring platform 40 and/or associated database 44. In some implementations, the traffic is routed through a gateway 42 between the aggregation network 34 and the monitoring platform 40.

Continuing with FIGS. 10 and 11, the probe 16 according to certain implementations may also analyze network conditions and network health metrics. In some implementations, the probe 16 may operate in coordination with various components of system 10 to change connectivity mechanisms, or network traffic routes from tenants 14A, 14B, 14C, 14D, 14E through the WAN 12. In certain embodiments, the probe 16 can also detect rogue devices on tenant 14A, 14B, 14C, 14D, 14E systems. In various implementations, the probe 16 and/or monitoring platform 40 are configured to collect and analyze data and generate reports regarding rouge devices and/or connectivity issues over the private WAN 12 to a monitoring server 44. In certain implementations, various mobile devices can be notified via the public internet 20 of rogue devices detected and alerted across the private WAN 12.

In various implementations, the probe 16 is configured for dynamic leak detection, wherein the probe 16 is configured to monitor targets on the public internet and cause the dashboard to notify users of private WAN leaks to the public internet. It is appreciated that protocol leaks, DNS leaks, HTTP leaks, port leaks and the like can be detected via the probe 16 and flagged or otherwise monitored and displayed by the dashboard in these implementations such that the private WAN 12 is never accidentally connected to unsecured network segments which have Internet access. That is, these implementations are configured to recognize, document and report instances where private devices are connected to unsecured networks by generating alerts and/or taking corrective measures to seal such leaks. In such implementations, it is thereby possible for a network administrator to prohibit users from accessing specified sites, such that the probe 16 can generate alarms in the event that firewall configuration allows access to prohibited sites. For example, in highly segmented networks where complex firewall rules exist, the probe(s) 16 can monitor traffic through those firewall gateways and detect prohibited traffic and correspondingly generate an alarm.

In another such example, in a point-of-sale (POS) POS (Point-of-Sale) network, it is possible to configure the network as whitelist-only, so the POS devices should never be able to get to common websites, as would be understood. In such an example implementation, the system with dynamic leak detection is configured to generate security alarms if traffic is ever allowed to those common websites. Accordingly, if a firewall is ever replaced or someone botches a configuration, it could normally go undetected for years, but under these implementations the configuration error is able to be detected and reported in minutes.

In further implementations, the probe 16 is configured to monitoring health metrics for the tenant 14A, 14B, 14C, 14D, 14E and/or WAN 12. In some implementations, the probe 16 is constructed and arranged within the WAN 12 to self-heal the network.

In some implementations, the probe 16 is in operational communication with an on/off port 17, such as but not limited to a power strip. In these and other implementations, the on-off port is configured to turn off and/or reboot various portions of a tenant 14A, 14B, 14C, 14D, 14E network and/or devices 15 within the network.

In certain embodiments, probe 16 may also analyze and report uptime data of other devices 15 on the same tenant 14. For example, a tenant 14 may include two or more devices 15, such as a freezer and drink machine, and report the uptime of each device 15 across the WAN 12 to the monitoring server 44.

Various implementations of the system 10 provide a multi-carrier private WAN 12 capabilities with the ability to monitor those with connectivity probes 16, failover from one mobile data network 26 to another, provide SD-WAN connectivity, and easily scale for customers/tenants of different sizes. Another technical improvement represented by the system 10 is the capacity to failover to/from a public internet 20 connection to a private WAN 12 connection.

Figure 13:
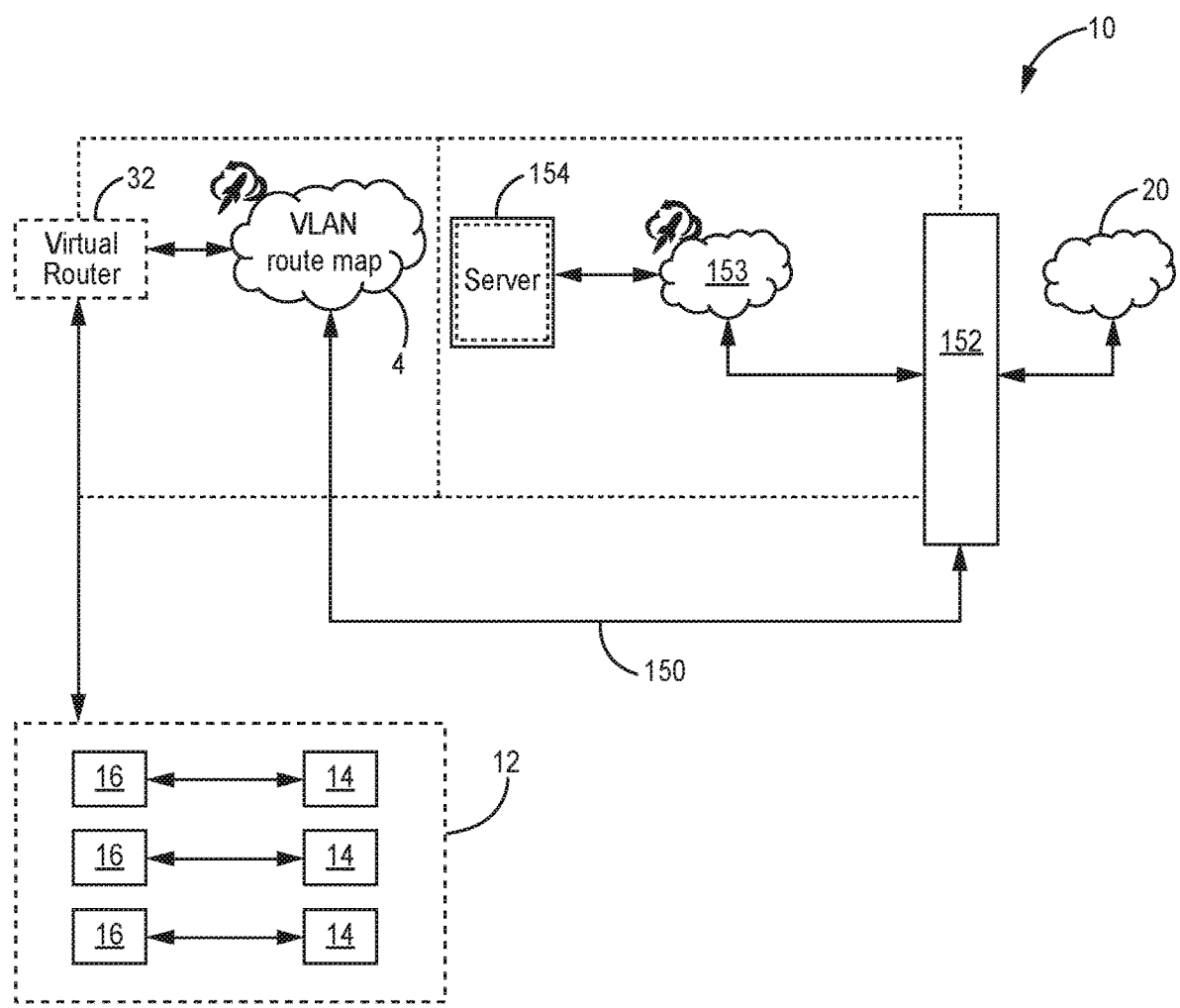
FIG. 13 is a schematic depiction of the system, according to one implementation.

As shown in FIG. 13, WAN 12 monitoring is performed via an anonymous probe 16 connection, without the requirement of special hostnames or IP addresses for the private WAN 12.

In these implementations, a virtual router 32 is configured with one or more rules or route maps 4 to determine destination IP addresses for packets originating on the WAN 12 from probes 16. In these implementations, if the destination IP address matches any of a set of defined public destination IP addresses, then that traffic is routed to a dedicated VLAN interface 150 on the firewall 152. That firewall 152 in turn applies ingress filtering and routes 153 the traffic to the server 154.

In a subsequent step, the server 154 evaluates the hostname that the traffic was addressed to in order to determine if the probe 16 pulse is a primary or failover source pulse or the like, as would be appreciated by those of skill in the art in view of U.S. application Ser. No. 15/789,554, filed Oct. 20, 2017, which has been incorporated herein.

In another optional step, the traffic flows back out the same way it came in—along the route 153/150—having rules and route maps 4 in the same places that send the traffic in reverse back through the private WAN 12 source IP address and thus back to the originating probe 16.

It is appreciated that under these implementations, the system 10 is able to detect and respond to private WAN 12 pulses and traffic from probes 16 without ever exposing private WAN 12 IP addresses to the public internet 20.

EXAMPLES

In one illustrative example, a public utility company desires to put 4G/5G private WAN 12 connections in its vehicles. The public utility has a small (low bandwidth) internet connection at their corporate network 54 and wants their users to have filtered internet 20 access to be provided by the system 10. In this configuration, the tunnel 100 between the WAN 12 and the utility company network 54 is configured to allow split-tunneling of traffic, as shown in FIG. 9. In this configuration the system 10 applies filtering policies allowing 4G users (tenants 14) to access only specific internet 20 sites. Other traffic to/from the WAN 12 is routed across the VPN tunnel 100 to the corporate network 54. This configuration reduces the bandwidth required by the utility company and also allows roaming users/tenants 14 and devices 15 to access a restricted list of internet 20 and resources on the corporate network 54.

In another illustrative example, an ice cream production company has thousands of refrigerated trucks and has a server 58 capable of monitoring the condition and temperature of the freezer on the refrigerated trucks over a 4G connection. The company implements the system 10 and private WAN 12 connection to allow Internet of Things ("IoT") devices 15 installed within each truck to communicate to a central server 58 on a corporate distributed network 54. In many of these implementations, the IoT devices 15 do not need Internet 20 connectivity and therefore it is desired to route all traffic over the VPN connection 100 where specific requests can be allowed to reach only the central server 58. If desired, IoT device 15 traffic could be allowed to egress some, all, or partial traffic to internet 20 targets.

Although the disclosure has been described with references to various embodiments, persons skilled in the art will recognized that changes may be made in form and detail without departing from the spirit and scope of this disclosure.

What is claimed is:

1. An end-to-end private networking system, comprising:
   a) a private wide area network comprising
      i) two or more tenants; and
      ii) a network core comprising an aggregation network;
   b) a distributed network;
   c) a monitoring platform in communication with the aggregation network; and
   d) a probe in association with at least one of the two or more tenants, wherein:
      i) the two or more tenants are connected to the network core via at least one mobile data network,
      ii) the network core segments traffic from the two or more tenants,
      iii) the private wide area network is in communication with the distributed network via a secure tunnel in communication with the network core and the distributed network,
      iv) the monitoring platform is configured to receive data from the probe to analyze network conditions and network health metrics, and
      v) the probe is configured to operate in coordination with one or more system components to change a network traffic route through the private wide area network for at least one of the two or more tenants.

2. The system of claim 1, wherein the network core further comprises one or more virtual routers.

3. The system of claim 1, wherein the distributed network comprises at least one firewalled connection to public internet.

4. The system of claim 1, wherein the at least one mobile data network connects the two or more tenants to the network core via at least one of a 4G, 5G, LTE, or low earth orbit satellite connection.

5. The system of claim 1, further comprising at least two mobile data networks wherein the tenants are configured to failover between the at least two mobile data networks.

6. The system of claim 1, further comprising at least one firewall between the private wide area network and a public internet connection.

7. The system of claim 1, wherein at least one of the two or more tenants is an Internet of Things (IoT) device.

8. A method for providing a secure, private end-to-end networking comprising:
   providing at least two tenants on a secure wide area network (WAN) and at least one probe in association with at least one of the at least two tenants;
   connecting the at least two tenants to a router cluster and an aggregation network;
   isolating traffic for each of the at least two tenants from each other;
   sorting and filtering traffic from the at least two tenants via at least one route map on the aggregation network;
   egressing traffic from the aggregation network to a distributed network via a secure conduit;
   receiving data from the at least one probe at a monitoring platform in communication with the aggregation network, the monitoring platform configured to analyze network conditions and network health metrics; and
   operating the at least one probe in coordination with one or more system components to change a network traffic route through the WAN for at least one of the at least two tenants.

9. The method of claim 8, wherein traffic is egressed to the distributed network via a virtual router in communication with the secure conduit.

10. The method of claim 9, further comprising egressing traffic via the virtual router to public internet.

11. The method of claim 8, wherein the distributed network comprises a firewall and a server.

12. The method of claim 8, wherein the at least one tenant is connected to the router cluster and aggregation network via at least one of a 4G, 5G, LTE, low earth orbit satellite connection.

13. The method of claim 8, wherein the router cluster and aggregation network are integral.

14. The method of claim 8, further comprising monitoring data usage and WAN connectivity and health metrics via a monitoring platform in communication with the aggregation network.

15. A method for providing end-to-end private networking via a private wide area network (WAN) comprising:
   connecting at least two tenants to an aggregation network, wherein the at least two tenants both generate traffic;
   routing traffic through the aggregation network via a router cluster applying at least one route map;
   isolating traffic for each of the at least two tenants from each other;
   egressing traffic from the aggregation network to a distributed network via a secure conduit;
   routing traffic from at least one probe in association with at least one of the at least two tenants to a monitoring platform, wherein the monitoring platform is in operable communication with the aggregation network and the monitoring platform is configured to analyze network conditions and network health metrics, and
   operating the at least one probe in coordination with one or more system components to change a network traffic route through the WAN for at least one of the at least two tenants.

16. The method of claim 15, further comprising gathering data usage information and displaying it on a dashboard via the monitoring platform.

17. The method of claim 16, further comprising generating data usage alerts.

18. The method of claim 15, wherein the secure conduit is a virtual private network (VPN) connection.

19. The method of claim 15, further comprising egressing traffic from the aggregation network to public internet via at least one firewalled gateway.

20. The method of claim 15, wherein the at least one tenant comprises more than one mobile device.

\* \* \* \* \*